United States Patent [19]

Morra et al.

[11] Patent Number: 5,304,404
[45] Date of Patent: Apr. 19, 1994

[54] METHOD FOR GRAFTING HYDROPHILIC MONOMERS CONTAINING DOUBLE BONDS ONTO FORMED BODIES WITH POLYMER SURFACES

[75] Inventors: Marco Morra, Cortiglione; Ernesto Occhiello; Fabio Garbassi, both of Novara, all of Italy

[73] Assignee: Istituto Guido Donegani S.p.A., Novara, Italy

[21] Appl. No.: 955,055

[22] Filed: Oct. 1, 1992

[30] Foreign Application Priority Data

Oct. 2, 1991 [IT] Italy .............. MI91A002607

[51] Int. Cl.$^5$ .............................. B05D 1/18
[52] U.S. Cl. .................. 427/512; 427/430.1; 427/558; 427/559
[58] Field of Search ............ 427/493, 512, 558, 559, 427/430.1; 428/336

[56] References Cited

U.S. PATENT DOCUMENTS 4,360,541 11/1982 Costanza et al. .
4,647,474 3/1987 Masuda et al. .................. 427/512

FOREIGN PATENT DOCUMENTS 2107723 5/1983 United Kingdom .

OTHER PUBLICATIONS

Ogiwara et al, Journal of Applied Polymer Science, vol. 35, No. 6, May 5th, 1988, pp. 1473–1481.
Patent Abstracts of Japan, vol. 12, No. 467(C–550), Dec. 7, 1988, & JP-A-63-186-712, Aug. 2, 1988, Ito Kiichi, et al., "Improvement in Water-Absorptivity of Sponge".
Database WPIL, AN 89002524, & JP-A-63-278-523, Nov. 16, 1988.
Database WPIL, AN 90011701, & JP-A-1-292-103, Nov. 24, 1989.

Primary Examiner—Bernard Pianalto
Attorney, Agent, or Firm—Oblon, Spivak, McClelland, Maier & Neustadt

[57] ABSTRACT

A method for grafting hydrophilic monomers containing double bonds onto polymer surfaces in aqueous solution.

The grafting is activated by ultraviolet radiation and by the presence in suspension of a photoactivator of controlled particle size distribution.

7 Claims, No Drawings

METHOD FOR GRAFTING HYDROPHILIC MONOMERS CONTAINING DOUBLE BONDS ONTO FORMED BODIES WITH POLYMER SURFACES

This invention relates to a method for grafting hydrophilic monomers containing double bonds onto formed bodies with polymer surfaces.

More specifically, the invention relates to a method for grafting hydrophilic monomers containing double bonds onto formed bodies with polymer surfaces, the method being conducted in an aqueous medium in the presence of a solid polymerization photoactivator of controlled particle size distribution dispersed in the aqueous medium, and in the presence of ultraviolet radiation.

Numerous technical properties of polymers depend on their surface characteristics and in particular their hydrophilicity or hydrophobicity as described in the text by S. Wu entitled, "Polymer Interface and Adhesion", published by Marcel Dekker, New York 1982.

From this text it is apparent that polymer surfaces are generally deficient in a whole series of properties of considerable technical interest, such as wettability, printability, adhesion, antistatic properties, resistance to clouding, hydrorepellence, static and dynamic coefficient of friction, etc.

Numerous surface treatments are known in the art for improving said properties, many of these being described for example in the aforesaid text of S. Wu.

A first type of treatment is to chemically attack the surface, with consequent surface modification of the polymer material. Such treatment consists generally of bringing the surface into contact with solutions which may be acid, basic and/or oxidizing depending on the type of polymer.

However, this type of treatment requires the use of potentially dangerous aggressive liquids which are toxic to the working environment and of which the disposal, when spent, is always problematic.

Another way of modifying the surface of polymers is to use a physical method, of which the most frequently cited are flame treatment, corona discharge and low pressure plasma treatment.

In the first two cases the disadvantages mainly relate to the difficulty of achieving uniform treatment on objects of complex shape. In the case of treatment with corona discharge and low pressure plasma, there is only limited effectiveness, the effect rapidly falling off with time. In the case of low pressure plasma a vacuum system is required, the operation of which can make the process complicated and costly.

The second type of treatment consists of depositing on the polymer surface a layer providing the desired properties.

A typical case, used mainly to improve paintability, consists of applying a primer. This is a substance which provides an intermediate layer between the polymer and paint (or adhesive) which optimizes their interaction. The main disadvantage is the need to apply a very thin layer of predetermined thickness. A second is that toxic solvents usually have to be used.

The primer is bonded only physically to the substrate, and to obtain better results, particularly in terms of adhesion, grafting techniques have been suggested which allow the formation of a surface polymer layer bonded chemically to the substrate.

Methods known in the art are often activated by ultraviolet radiation in the presence of a photoactivator.

In a typical example, as reported in an article by Y. Ogivara, N. Koike, H. Kubota and Y. Hata (which appeared in the Journal of Applied Polymer Science, vol. 35, page 1473, 1988), the photoactivator is dissolved in an organic solvent and the resultant solution is used to swell the polymer surface. Alternatively, the photoactivator is deposited on the polymer surface from solutions which contain it in mixture with a filming agent.

The monomer to be grafted is dissolved in a solvent chosen according to its ability to dissolve the monomer.

It is apparent that this process has two main drawbacks. Firstly, the photoactivator remains on the polymer surface, so being able to cause polymer degradation by interaction with ultraviolet radiation, for example due to exposure to sunlight. The second drawback is the use of generally toxic solvents which are difficult to dispose of and can alter mechanical properties by plasticizing the material.

In addition, to prevent homopolymerization of the monomer to be grafted in solution, it is often found necessary, as described for example by M. B. Huglin and B. L. Johnson in an article published in the Journal of Polymer Science, vol. A-1, page 1379, 1969, to add polymerization inhibitors such as cationic salts to the solution, this further complicating effluent disposal.

In a further example, grafting can be achieved by maintaining the object in a chamber in which the atmosphere is saturated with the monomer to be grafted, and UV radiation is present.

Examples of this type of process are reported by H. Kubota and Y. Ogivara in an article published in the Journal of Polymer Science, Polymer Letters Edition, vol. 21, page 367, 1983, and by P. Y. Yao and B. Ranby in an article published in the Journal of Polymer Science, vol. 41, page 1459, 1990.

In both these examples the photoactivator is deposited as in the previously described case, i.e. by bringing the polymer surface into contact with a surface of the photoactivator in a suitable organic solvent.

The deposition of the photoactivator has the same drawbacks as in the previously described case. In addition, an apparatus is required to achieve pressure reduction (vacuum) and to obtain an atmosphere enriched in the monomer to be grafted, resulting in high apparatus and operating costs.

The applicant has now found a method for grafting monomers onto polymer surfaces by which all the drawbacks of the known art are obviated.

More specifically, the applicant has found that hydrophilic monomers containing double bonds can be grafted onto polymer surfaces under activation by ultraviolet radiation in aqueous solution by a simple procedure which does not require the use of any solvent or other toxic component, using a photoactivator which is insoluble in water and is of a particle size distribution such as to form a stable suspension in the solution. Formed bodies are obtained with optimized surface properties, such as wettability, printability, adhesion, antistatic effect etc.

The present invention therefore provides a method for grafting hydrophilic monomers containing double bonds onto formed bodies with polymer surfaces, comprising:

a) dissolving in water at least one hydrophilic monomer containing double bonds to obtain a solution with a concentration exceeding 0.2 moles/liter;

b) dispersing in the obtained solution a solid polymerization photoactivator which is insoluble in water and has a particle size distribution such as to give a suspension stable for at least one day;

c) immersing the formed body in the solution/suspension obtained in this manner;

d) irradiating the formed body and the solution/suspension with ultraviolet radiation.

The formed bodies treated by the method of the present invention are preferably polymer articles obtained by the more common transformation methods for these materials, i.e. injection moulding, extrusion, thermoforming, blow moulding, pultrusion etc.

Any elastomeric or thermosetting polymer material can be used for preparing the said formed bodies, for example olefinic polymers such as polyethylene (PE), polypropylene, ethylene-propylene elastomers, acrylic resins such as polymethylmethacrylate (PMMA), thermoplastic polyesters such as polyethyleneterephthalate (PET), polybutyleneterephthalate, polyethylenenaphthalenedicarboxylate, unsaturated polyester resins etc.

Formed bodies of non-polymer material, for example of wood or metal, covered with a polymer layer can be treated by the present method.

In a preferred embodiment of the method according to the present invention, the aqueous solution has a concentration exceeding 0.7 moles/liter, and the hydrophilic monomer is an acrylic monomer supporting at least one —OH and/or —COOH group.

Examples of acrylic monomers usable in the present invention are acrylic acid, methacrylic acid, hydroxyethylacrylate, hydroxyethylmethacrylate, etc.

The photoactivator, which is insoluble in water, is dispersed in the solution to a concentration of between $5 \times 10^{-6}$ and $5 \times 10^{-3}$ moles/liter of solution, and preferably between $5 \times 10^{-5}$ and $5 \times 10^{-3}$ moles/liter of solution.

To obtain stability for at least one day, the polymerization photoactivator is used with a particular particle size distribution. At least 50 wt % of the material is present in the form of particles with a diameter of less than 0.3 mm.

The term "suspension stable for at least one day", as used in the present description and claims, means a suspension which to the bare eye shows no evident traces of sediment after standing for 24 hours.

The photoactivator is able to activate polymerization of the double bond-containing monomer at the surface of the formed body of polymer material in the presence of radiation with electromagnetic waves of wavelength between 200 and 380 nm.

Typical examples of polymerization photoactivators are benzophenone, benzoylperoxide, anthraquinone etc.

The grafting process is operated typically at ambient temperature, i.e. 15°–35° C., but the process can operate within the limits dictated by phase transition. During the course of the process, the formed body and the aqueous solution/suspension are irradiated with electromagnetic waves of wavelength between 200 and 380 nm, and preferably between 250 and 380 nm or between 310 and 380 nm.

The thickness of the deposited material depends on the type of application, but is always between 0.01 and 30 μm. In this respect, it is known that certain properties, such as those connected with wettability, depend on the first molecular layer of each material, as taught by W. A. Zisman in an article published in Advances in Chemistry Series, volume 43, published by the American Chemical Society, Washington, 1964, pages 6–7. To ensure continuity of the deposited layer it should preferably be at least 0.01 μm thick for these applications.

For other applications, such as adhesion improvement, layer thicknesses of greater than 1 μm are preferred.

The present invention further relates to the formed bodies obtained by the aforesaid method.

More specifically, the present invention provides formed bodies with polymer surfaces covered with a layer obtained by grafting double bond-containing hydrophilic monomers in aqueous solution in the presence of a polymerization photoactivator dispersed in the solution, said grafting being activated by ultraviolet radiation.

Still more specifically, the present invention provides formed bodies with polymer surfaces covered with a layer obtained by a method comprising:

a) dissolving in water at least one hydrophilic monomer containing double bonds to obtain a solution with a concentration exceeding 0.2 moles/liter;

b) dispersing in the obtained solution a solid polymerization photoactivator which is insoluble in water and has a particle size distribution such as to give a suspension stable for at least one day;

c) immersing the formed body in the solution/suspension obtained in this manner;

d) irradiating the formed body and the solution/suspension with ultraviolet radiation.

Some examples are provided hereinafter to illustrate the invention, but without in any way a limitation to its scope.

EXAMPLE 1

A 0.4M solution of acrylic acid in deionized water was prepared, in which 0.002 moles/liter of benzophenone previously ground such that less than 50 wt % of particles had a size exceeding 300 μm were then suspended.

A 65×20×2.5 mm plate of polypropylene SP179 produced by Himont, Ferrara was then immersed in the solution, and the entire assembly was inserted into the reaction vessel.

The reaction environment was fed with nitrogen for a time of about 10 minutes.

The reaction vessel was then placed in an annular APQ 40 photoreactor, manufactured by Applied Photophysics Ltd. London, maintaining the temperature at 20° C. Irradiation was effected by medium pressure mercury lamps operating at 365 nm, for a time of 30 minutes.

The same procedure was repeated using benzophenone of which more than 50 wt % of particles had a size exceeding 300 μm.

The treated polymer plates were then washed with water and analyzed by XPS. Contact angles, deposited thickness and adhesion were also measured.

The XPS (X-ray phtoelectron spectroscopy) was used to evaluate the chemical composition of the deposited layer. A description of the XPS method is contained in the text "Practical surface analysis" by M. Seah and D. Briggs (published by Wiley, New York 1983, pages 359–396).

Table 1 shows that in the case of the sample produced with benzophenone of fine particle size distribution there is a surface layer of composition very similar to the theoretical composition of polyacrylic acid. In contrast, with benzophenone of coarse particle size distribution the surface has the chemical composition of polypropylene.

Examples of the two types of sample were then immersed in a solution of 1 g/l of methylene blue in water for a time of 12 hours. The samples were then washed with water and formed into sections which were then examined with a Leitz Orthoplan optical microscope.

In the case of the sample obtained with benzophenone of fine particle size distribution a coloured layer was observed corresponding to the deposition of a layer of polyacrylic acid of 18 μm thickness.

With benzophenone of coarse particle size distribution no coloured layer was observed, in accordance with the XPS observation of no polyacrylic acid deposition.

The water advancement and recession contact angles were measured with a DCA-322 dynamic contact angle measurer supplied by Cahn, Cerritos, USA. The method is described in the text by S. Wu entitled "Polymer Interface and Adhesion", published by Marcel Dekker, N. Y. 1982 on pages 260-262.

An immersion rate of 50 μm/s was used, the contact angles being determined during the second immersion/extraction cycles to eliminate time-dependency effects.

The values obtained are also given in Table 1. As can be seen, for the sample obtained using benzophenone of fine particle size distribution the advancement and recession angles are both very low, whereas for the sample obtained using benzophenone of coarse particle size distribution the contact angle is typical of polypropylene.

The adhesivity of the two types of sample was determined by a traction resistance test, effected by sticking an aluminium pin to the surface layer with an epoxy adhesive.

The measuring instrument used was the Sebastian II, produced by the Quad Group, who also supplied the aluminium pins coated with an epoxy resin able to withstand tractive forces of up to 700 kg/cm.

The traction resistance values are also shown in Table 1. It can be seen that there is a substantial improvement in adhesion only for the sample treated in the presence of benzophenone of fine particle size distribution.

The sample treated in the presence of benzophenone of coarse particle size distribution shows an adhesive behaviour identical to untreated polypropylene.

TABLE 1

| Particle size distr. (% < 0.3 mm) | XPS (% atom.) O | XPS (% atom.) C | Contact angle (°) advanc. | Contact angle (°) recess. | Tract. res. (kg/cm) |
|---|---|---|---|---|---|
| 14.3 | 2 | 98 | 96 | 78 | 0 |
| 69.0 | 40 | 60 | 20 | 0 | 110 |
| (*) | 3 | 97 | 96 | 80 | 0 |

(*)Comparison: untreated PP

EXAMPLE 2

Tests on the grafting of polyacrylic acid to polypropylene surfaces were conducted using the experimental procedure described in the preceding example.

The acrylic acid solution concentration and benzophenone particle size distribution (only 30wt % of particles exceeding 300 μm in size) were unchanged in the various tests. The concentration of benzophenone in suspension was however varied, the minimum being $5 \times 10^{-5}$ moles/liter.

Adhesion tests were conducted by the method described in the preceding example, the results being given in Table 2.

It will be noted that for a benzophenone concentration of $5 \times 10^{-5}$ moles/liter there is a slight reduction in adhesion properties, and that above $5 \times 10^{-4}$ moles/liter increasing the benzophenone concentration has no effect.

TABLE 2

| Benzophenone concentration (moles/l) | Traction resistance (kg/cm) |
|---|---|
| $5 \times 10^{-5}$ | 83 |
| $5 \times 10^{-4}$ | 115 |
| $3 \times 10^{-3}$ | 114 |

EXAMPLE 3

Tests on the grafting of polyacrylic acid to polypropylene surfaces were conducted using the experimental procedure described in Example 1.

The acrylic acid solution concentration was unchanged in the various tests. However, benzoylperoxide (BPO) was used as photoactivator at the concentrations and particle size distributions shown in Table 3.

Adhesion tests were conducted as described in Example 1.

Adhesion values exceeding those typical of polypropylene as such were obtained only for a benzoylperoxide particle size distribution in which at least 50% of particles were less than 300 μm in size.

TABLE 3

| Photoactivator | Particle size distr. (% < 0.3 mm) | Conc. (moles/l) | Tract. resist. (kg/cm) |
|---|---|---|---|
| BPO | 83.8 | $3 \times 10^{-4}$ | 98 |
| BPO | 5.6 | $3 \times 10^{-4}$ | 0 |

EXAMPLE 4

Tests on the grafting of polyacrylic acid to polypropylene surfaces were conducted using the experimental procedure described in Example 1.

Only the treatment time was varied during the tests, giving rise to variations in the deposited thickness, as shown in Table 4.

Adhesion tests were conducted as described in Example 1.

Considerably higher adhesion values than for untreated polypropylene were obtained. These values are independent of the treatment time and the deposited thickness.

TABLE 4

| Treatment time (minutes) | Thickness (μm) | Tract. res. (kg/cm) |
|---|---|---|
| 0 | 0 | 0 |
| 10 | 4,1 | 96 |
| 30 | 18,1 | 115 |
| 60 | 38,0 | 114 |

EXAMPLE 5

Tests on the grafting of polyacrylic acid to polypropylene surfaces were conducted using the experimental procedure described in Example 1.

The benzophenone solution concentration and particle size distribution were unchanged in the various tests.

The type of monomer containing double bonds used and its concentration in aqueous solution were varied as indicated in Table 5.

Adhesion tests were conducted as described in Example 1.

Considerably higher adhesion values than for untreated polypropylene were obtained.

TABLE 5

| Monomer | Concentr. (moles/l) | Tract. res. (kg/cm) |
| --- | --- | --- |
| AAc | 0.15 | 0 |
| AAc | 0.73 | 85 |
| AAc | 1.46 | 115 |
| AAc | 2.19 | 114 |
| HEMA | 0.79 | 112 |
| HEMA | 1.12 | 111 |
| HEA | 0.87 | 118 |
| HEA | 1.20 | 118 |

AAc = acrylic acid
HEMA = hydroxyethylmethacrylate
HEA = hydroxyethylacrylate

EXAMPLE 6

Grafting tests on various polymer surfaces were conducted using the experimental procedure and conditions described in Example 1.

Adhesion tests were conducted as described in Example 1.

For polymers treated by the process of the present invention, adhesion values considerably higher than those for the same polymer untreated were obtained (Table 6).

TABLE 6

| Polymer | Tract. res. (kg/cm) |
| --- | --- |
| Untreated PE | 0 |
| PE | 104 |
| Untreated PMMA | 38 |
| PMMA | 80 |

TABLE 6-continued

| Polymer | Tract. res. (kg/cm) |
| --- | --- |
| Untreated PET | 24 |
| PET | 152 |

We claim:

1. A method for grafting hydrophilic monomers containing double bonds onto formed bodies with polymer surfaces, comprising:
   a) dissolving in water at least one hydrophilic monomer containing double bonds to obtain a solution with a concentration exceeding 0.2 moles/liter;
   b) dispersing in the obtained solution a solid polymerization photoactivator which is insoluble in water and has a particle size distribution such as to give a suspension stable for at least one day;
   c) immersing the formed body in the solution/suspension obtained in this manner;
   d) irradiating the formed body and the solution/suspension with ultraviolet radiation.

2. A method as claimed in claim 1, wherein the formed bodies are articles of polymer material.

3. A method as claimed in claim 1 or 2, wherein the polymer material is chosen from thermoplastic, elastomeric and thermosetting polymers.

4. A method as claimed in claim 1 or 2 wherein the aqueous solution has a concentration exceeding 0.7 moles/liter and the hydrophilic monomer is an acrylic monomer supporting at least one —OH and/or —COOH group.

5. A method as claimed in claim 1 or 2, wherein the photoactivator is dispersed in the solution in a concentration of between $5 \times 10^{-6}$ and $5 \times 10^{-3}$ moles/liter of solution.

6. A method as claimed in claim 1 or 2, wherein the polymerization photoactivator is used with a particle size distribution such that at least 50 wt % of the material is present in the form of particles with a diameter of less than 0.3 mm.

7. A method as claimed in claim 1 or 2 wherein the formed body and the aqueous solution/suspension are irradiated with electromagnetic waves of wavelength between 200 and 380 nm.

* * * * *